United States Patent [19]

Hampshire

[11] 3,988,089

[45] Oct. 26, 1976

[54] APPARATUS FOR MANUFACTURING CURVED BODIES OF FIBER REINFORCED PLASTIC

[75] Inventor: William J. Hampshire, Peninsula, Ohio

[73] Assignee: The Goodyear Tire & Rubber Company, Akron, Ohio

[22] Filed: Sept. 10, 1975

[21] Appl. No.: 611,978

[52] U.S. Cl. .................................... 425/82; 118/36; 118/308; 425/90; 425/305 R; 425/521

[51] Int. Cl.$^2$ ............................................ B29J 5/00

[58] Field of Search .................. 425/80, 81, 82, 90, 425/110, 305, 510, 521; 264/108, 115; 118/36, 308, 404, 405

[56] References Cited

UNITED STATES PATENTS

| | | | |
|---|---|---|---|
| 3,073,534 | 1/1963 | Hampshire | 425/80 X |
| 3,177,275 | 4/1965 | Brenner | 425/82 |
| 3,244,302 | 4/1966 | Best | 425/83 X |

FOREIGN PATENTS OR APPLICATIONS

| | | | |
|---|---|---|---|
| 566,851 | 5/1958 | Belgium | 264/115 |

*Primary Examiner*—Robert D. Baldwin
*Attorney, Agent, or Firm*—F. W. Brunner; P. E. Milliken; Frederick K. Lacher

[57] ABSTRACT

Manufacturing a curved fiber reinforced body of plastic material by cutting plastic impregnated fibers with a cutter, directing the cut fibers onto a rotating form and applying a plastic material to the fibers. The fibers are deposited in predetermined radial and circumferential directions to build up a preform of overlapping layers of oriented fibers as the form is rotated. The preform is shaped by compression between mating shaping forms to substantially the final molded shape. The plastic material contains a curative and is partially cured under controlled conditions after the preform is built. The preform is then preheated in an oven and molded under predetermined pressures and temperatures.

17 Claims, 31 Drawing Figures

APPARATUS FOR MANUFACTURING CURVED BODIES OF FIBER REINFORCED PLASTIC

This invention relates generally, as indicated, to a method and apparatus for manufacturing a fiber reinforced plastic body of revolution or segment thereof. It is especially directed to rings or curved bodies where high strength is required, as, for example, tire supporting rings which are mounted on a rim for supporting a tire in the deflated condition.

Heretofore high strength of reinforced plastic rings, wheels and other curved bodies has been obtained through orienting the fibers by filament winding; however, the cost of equipment has been high and the processing speed has been slow with a relatively high labor requirement. Other fiber reinforced plastic parts have been made by using fiberglass roving cut to lengths of two inches or less and deposited in a random pattern into a resin binder. This procedure is satisfactory for some applications but does not provide the strength possible with oriented fiber reinforcement having greater length fibers.

In the random distribution of fibers for the sheet molding process the roving is run through chopping guns. The roving is bent around a circular path which tends to open up the roving and distribute cut particles randomly on the prepared surface. Chopping guns of this type are not suitable where it is necessary to maintain the integrity of each cut fiber and place the fiber on the prepared surface in the proper orientation. An example of such a chopping gun used heretofore for random distribution of fibers may be found in applicant's U.S. Pat. No. 3,118,336.

Nozzles with venturis have been used to spray fiber and resin on a prepared surface and examples of nozzles may be found in applicant's U.S. Pat. Nos. 2,929,436 and 3,073,534. The nozzles of these patents prevent sticking of the fibers to the nozzle but have a throat diameter greater than that desired for coating and propelling integral fibers with a relatively small cross section.

In applicant's U.S. Pat. No. 3,382,129 granted May 7, 1968 and U.S. Pat. No. 3,378,613 granted Apr. 16, 1968, an apparatus and method are described for laying down a linear sheet of intermixed resin and fibers on a conveyor belt by controllably moving nozzles relative to the conveyor belt. With this equipment, the lamination is provided by the oscillating movement of the nozzles as the conveyor belt moves past them. Circular articles can be made with this apparatus by manipulating the nozzles to orient the fibers for a circular object and then cutting the sheet into the desired circular form; however, this involves additional equipment which is not desirable in the mass production of articles such as wheels or curved tire supports.

With the foregoing in mind, it is the principal object of this invention to provide an improved method and apparatus for manufacturing curved bodies of fiber reinforced plastic.

Another object is to provide a support rotatable about a vertical axis and on which reinforcing fibers and plastic material are deposited.

A further object is to provide for orienting the reinforcing fibers as they are deposited on the rotating support.

A still further object is to provide for cutting the reinforcing fibers to predetermined lengths while maintaining the integrity of the strands of fibers.

Another object is to provide for coating with plastic and directing the fibers to the desired positions on the rotating support.

A further object is to provide for partially curing the plastic material coating the fibers after removal from the rotating support.

A still further object is to provide for shaping and compressing the deposited fibers and plastic material for molding.

Another object is to provide a series of forming members to shape the build-up preform of fibers and plastic.

A further object is to provide for preheating and molding a shaped preform under compression and heat.

A still further object is to provide for controlling the distribution of the fibers on the rotating support to obtain the desired thickness of the body.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

Figure 1:
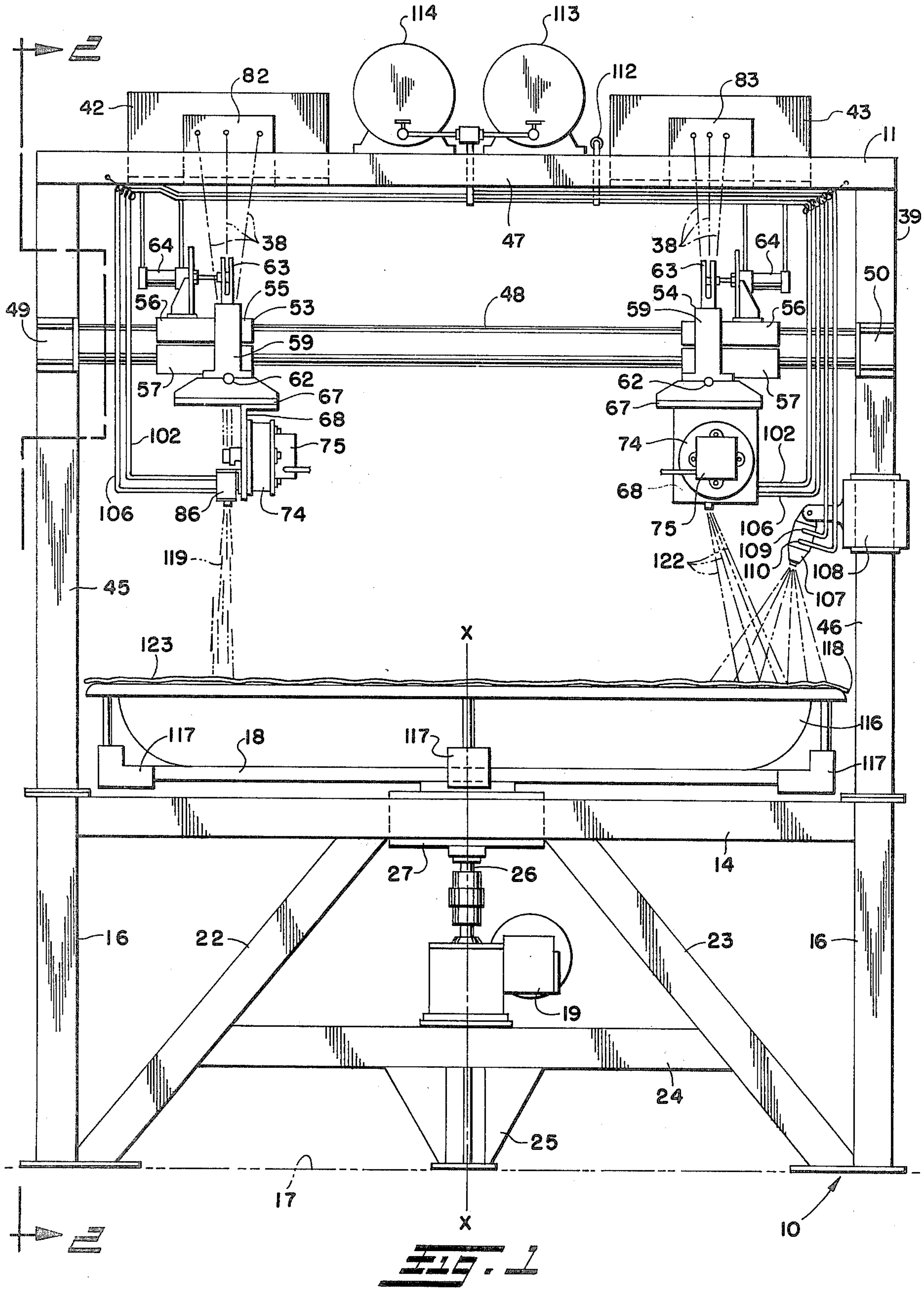
FIG. 1 is a front elevation of a preform building machine showing the depositing of the reinforcing fibers and plastic material on a rotating form in accordance with the invention.
Figure 3:
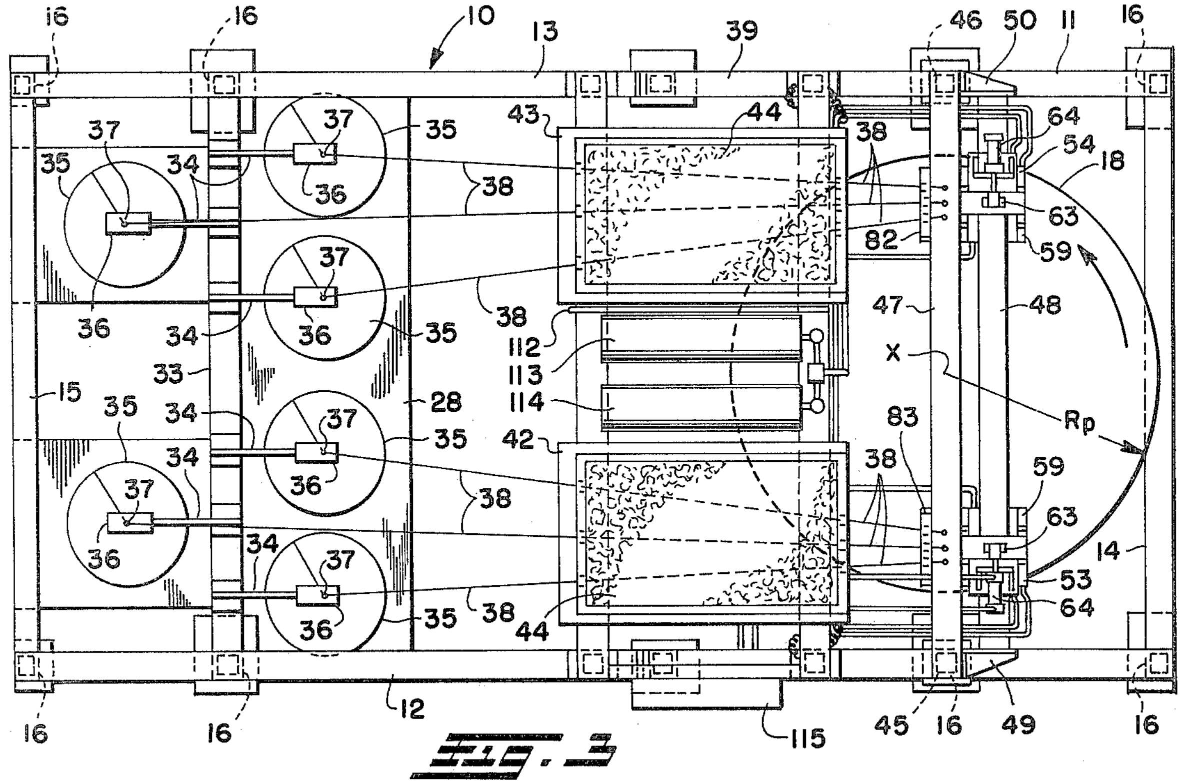
FIG. 3 is a plan view of the preform building machine taken along the plane of line 3—3 of FIG. 2.
Figure 2:
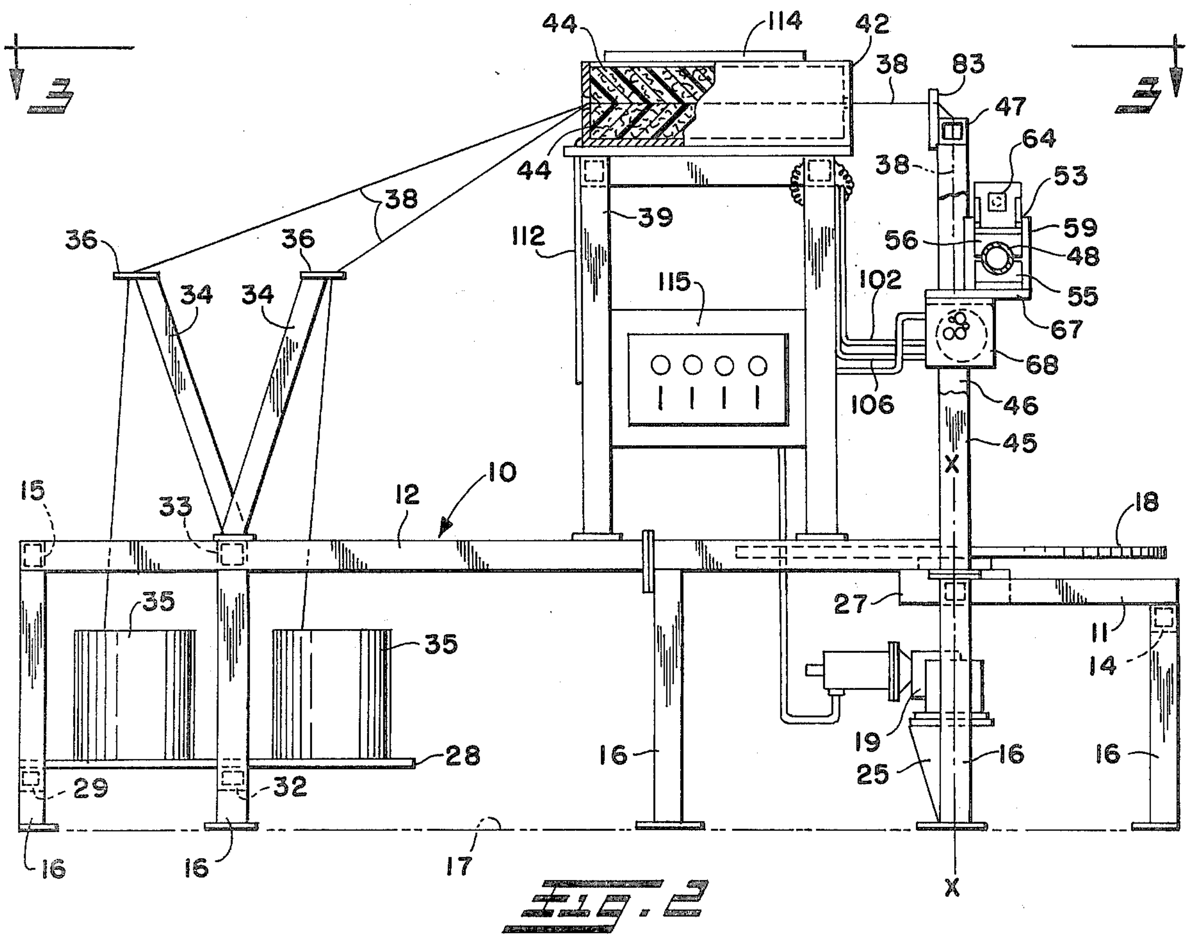
FIG. 2 is a side elevation of the preform building machine shown in FIG. 1 with parts being broken away.

Referring to FIGS. 1, 2 and 3, a preform building machine 10 is shown for building the preform of a body curved about an axis of revolution having a radius of curvature. The preform building machine 10 has a frame 11 including side members 12 and 13 connected to end members 14 and 15. Legs 16 are fastened to the side members 12 and 13 and to end members 14 and 15. The legs 16 engage a supporting surface or floor 17.

A rotatable support or circular platform 18 is located at one end of the frame 11. The platform 18 has a generally horizontal disposition and is rotatable about a vertical axis X—X. As shown in FIGS. 1 and 2, drive means including an electric motor 19 is supported under the platform 18 by struts 22, 23 and 24 connected to the frame 11 and by a pedestal 25 extending to the floor 17. A shaft 26 extends upwardly from the motor 19 to the circular platform 18 through suitable bearings in a transverse beam 27 extending between the side members 12 and 13.

At the other end of the frame 11, a fixed horizontal platform 28 is mounted on a transversely extending supporting member 29 located below the end member 15 and fastened to the legs 16 supporting the end member 15. The platform 28 is also supported by another transversely extending supporting member 32 spaced from the end of the frame 11 and connected to another pair of legs 16 supporting the side members 12 and 13. Above the supporting member 32 and connecting the side members 12 and 13 is a third transversely extending supporting member 33 connecting the side members 12 and 13. This third supporting member 33 has arms 34 extending generally upward from the member to positions over the platform 28 where rolls 35 of fiberglass roving may be positioned. Guide plates 36 are mounted on the ends of the arms 34 and contain carbide or ceramic guide eyes 37 through which strands 38 of fiberglass roving is guided as shown in FIGS. 2 and 3.

Between the circular platform 18 and the rolls 35 of fiberglass roving, an elevated structure 39 is mounted on the side members 12 and 13 to support containers 42 and 43 containing a sponge material 44 through which the strands 38 are pulled. The sponge material 44 may be saturated with water or other suitable liquid to remove static charges from the surface of the strands 38 as they pass through the containers 42 and 43.

Vertical posts 45 and 46 extend upwardly from the side members 12 and 13, respectively, at positions adjacent the circular platform 18 and are connected at the top by a cross beam 47. A supporting shaft 48 is mounted on the vertical posts 45 and 46 by brackets 49 and 50 extending outwardly from the posts so that the shaft is parallel to the cross beam 47 but displaced a predetermined distance toward the end of the frame 11 from the cross beam. Slidably mounted on the shaft 48 are two fiber cutting and coating assemblies 53 and 54 located a predetermined distance above the circular platform 18. These assemblies 53 and 54 are essentially the same and therefore the description for assembly 54 will also apply to assembly 53.

Figure 4:
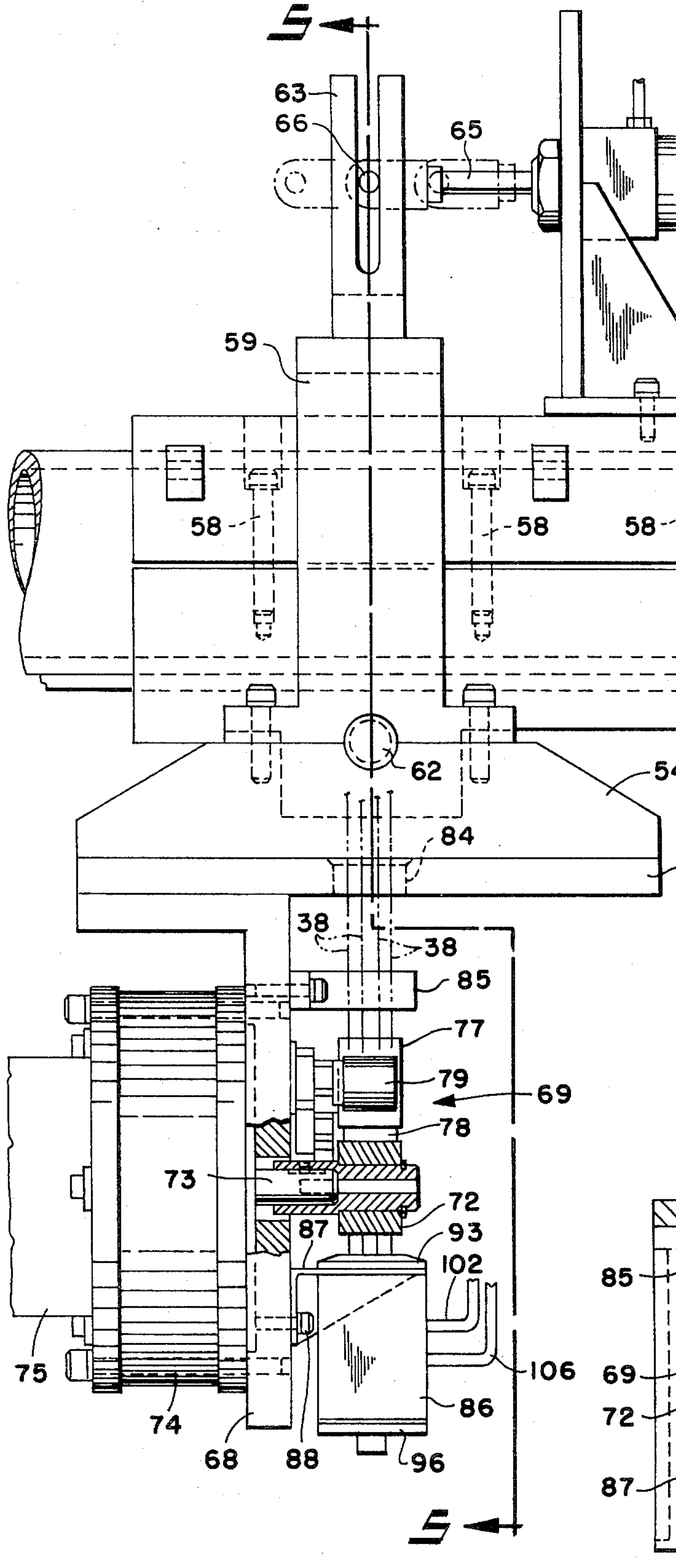
FIG. 4 is an enlarged fragmentary front elevation of the fiber cutting, coating and controlling apparatus as seen in FIG. 1 with parts being broken away to illustrate the driving mechanism.
Figure 5:
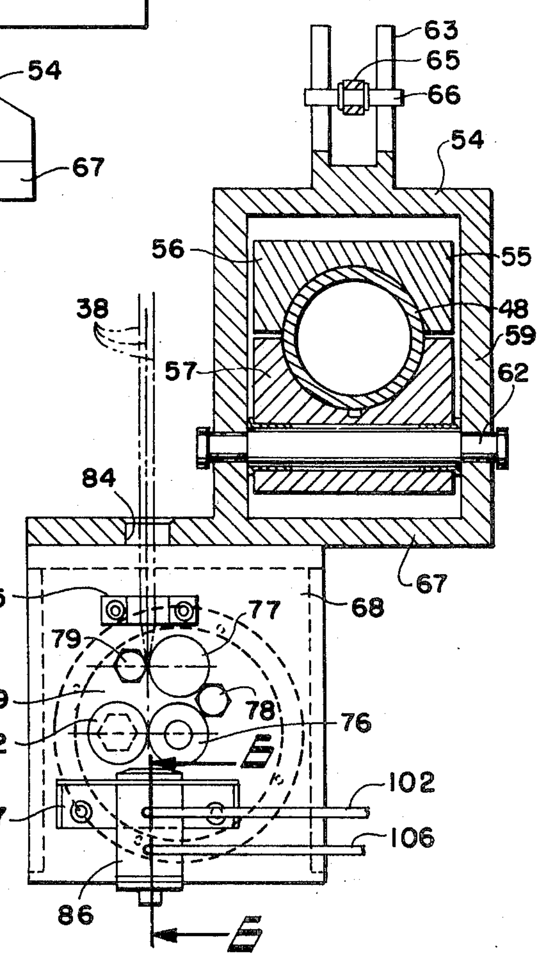
FIG. 5 is a further enlarged sectional view taken along the planes of line 5—5 of FIG. 4.
Figure 6:
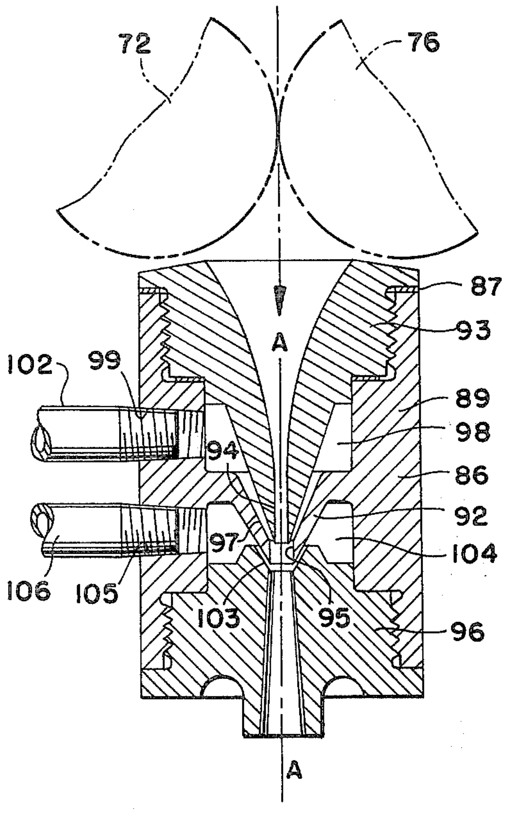
FIG. 6 is a still further enlarged sectional view of the nozzle taken along the plane of line 6—6 of FIG. 5.

Referring to FIGS. 4, 5 and 6, enlarged views of the assembly 54 are shown. A split bushing 55 having an upper half 56 and a lower half 57 is clamped to the shaft 48 by screws 58. A housing 59 is pivotally mounted on a pin 62 extending through the lower half 57 of the bushing 55 and through holes in the housing. A yoke 63 is mounted on top the housing 59 and a double-acting piston and cylinder assembly 64 is mounted on the upper half 56 of the split bushing 55. A piston rod 65 carries a connecting pin 66 disposed in the slot of the yoke 63 so that upon actuation of the piston and cylinder assembly 64 and movement of the piston rod the housing 59 will be rocked about the pin 62. Preferably the cylinder of the piston and cylinder assembly 64 is connected to a source of air pressure such as factory air for actuation. The air supply for the piston and cylinder assemblies of fiber cutting and coating assemblies 53 and 54 may be actuated by a cam (not shown) that is mounted on the platform 18.

The housing 59 has a base plate 67 which extends to a position below the shaft 48 and supports a downwardly extending plate 68. As shown in FIG. 1, the plate 68 may be mounted facing in different directions. In fiber cutting and coating assembly 53, the plate 68 extends longitudinally of the frame 11 while in the assembly 54 the plate extends transversely of the frame.

As shown in FIGS. 4 and 5, a cutter 69 is mounted on the plate 68 for cutting the strands 38 of roving in predetermined fiber lengths and projecting them toward the platform 18. A driving cutter blade roll 72 is mounted on a shaft 73 extending through the plate 68 to a speed control mechanism 74 driven by a motor 75. The cutter blade roll 72 is in engagement with a mandrel roll 76. In tangential alignment with the cutter blade roll 72 at the point of contact with the mandrel roll 76 is a second driving roll 77 which has the same diameter as the mandrel roll. An idler roll 78 is interposed between the mandrel roll 76 and the second driving roll 77 in driving engagement for rotating the second driving roll at the same speed as the mandrel roll. A second idler roll 79 is mounted on the plate 68 for engagement with the second driving roll 77 at the point where it is in tangential alignment with the cutter blade roll 72.

As shown in FIGS. 1 through 3, the strands 38 are guided from the containers 42 and 43 of sponge material 44 through holes in guide plates 82 and 83 and then through holes in the cross beam 47 down through an opening 84 in the base plate 67 of housing 59 and then through a roving guide 85 of hardened steel which is also mounted on the plate 68. The strands 38 are engaged between the second driving roll 77 of the cutter 69 which may have a rubber covering and the second idler roll 79. The strands 38 are then driven between the cutter blade roll 72 and the mandrel roll 76 which also may have a rubber covering. The cutter blade roll 72 has blades spaced to cut the strands 38 in predetermined fiber lengths whereupon the cut lengths of fibers are projected through a coating nozzle 86 towards the platform 18.

Referring to FIG. 6, the longitudinal axis of the coating nozzle 86, indicated by the letters A—A, is in a plane tangential to the cutter blade roll 72 at the point where the roll engages the mandrel roll 76 so that the cut fibers are projected through the nozzle. The coating nozzle 86, shown in FIG. 6, is identical for both the fiber cutting and coating assemblies 53 and 54 and therefore only the construction of the one coating nozzle will be described with the understanding that this description also applies to the coating nozzle for the other assembly.

The coating nozzle 86 is mounted on the plate 68 by a bracket 87 fastened to the plate by a screw 88. The coating nozzle 86 has a generally cylindrical body 89 with a ring member 92 at the midsection. A converging funnel-shaped venturi member 93 is threaded in the end of the cylindrical body 89 adjacent the cutter 69 and has a throat 94 of reduced diameter. The converging end of the venturi member 93 at the throat 94 terminates at the ring member 92 which contains an orifice 95 having a diameter greater than the diameter of the throat of the venturi member. A diverging funnel-shaped member 96 is threaded in the cylindrical body 89 at the other side of the ring member 92 from the venturi member 93. An annular opening 97 is provided between the ring member 92 and venturi member 93 for spraying plastic material such as resin through the coating nozzle 86 when desired to coat cut fibers of strands 38. The opening 97 is in communication with a resin chamber 98 within the cylindrical body 89 and a port 99 is provided in the cylindrical body in communication with the resin chamber for receiving a fitting of a resin hose 102 in communication with a source of resin.

A second annular opening 103 is provided between the ring member 92 and the funnel-shaped member 96 for the transmittal of air into the coating nozzle 86 when desired for coating the cut fibers. The second annular opening 103 is in communication with an air chamber 104 in the cylindrical body 89 which contains a port 105 opening on the chamber for receiving a fitting of an air hose 106 in communication with a source of air pressure such as factory air.

Referring to FIG. 1, a resin spray nozzle 107 is mounted on a bracket 108 fastened to the post 46 and has ports 109 and 110 supplying air and resin, respectively, under pressure to the nozzle for spraying resin when desired. In this embodiment the spray nozzle provides a 100° fan spray with a 0.026 inch diameter or equivalent.

As shown in FIGS. 1 and 3, air under pressure is provided through a pipe 112 connected to a suitable source such as a factory compressed air system. The pipe 112 may be connected to the coating nozzles 86 and resin spray nozzle 17. Air pressure of from 80 to 100 p.s.i. is desirable for producing a vacuum in the venturi members 93 to coat the cut fibers of the strands 38 passing through the coating nozzles 86. A heated resin curative tank 113 and a heated liquid resin tank 114 are mounted on the elevated structure 39 and may be connected by suitable mixing and metering apparatus to mix curative with the resin. Epoxy resins suitable for use in this manner are set forth in U.S. Pat. No. 3,350,406 dated Oct. 31, 1967 in column 6, line 57 through column 9, line 71. The resin is supplied under pressure, if desired, to the coating nozzles 86 or resin spray nozzle 107. The curative provides for partial curing of a resin after mixture and coating of the cut fibers. Resin containing the curative is applied to the cut fibers of the strands 38 at a rate of 200 to 700 grams per minute. Any of the curative systems such as amines, polyamides or amides and acids or acid anhydrides may be utilized and especially the ones well known and utilized commercially such as Tonox, a commercial toluene diamine mixture. The curative systems preferred are those that will produce a cure at room temperature sufficient to give a dry tack-free handable preform that can be later heated and cured at about 250° to 300° F. to give a fully cured product having high heat softening temperatures and the required modulus.

A control panel 115 which is in communication with sources of electric power, resin curative supply and air pressure is mounted on the elevated structure 39. Suitable controls are incorporated in the control panel 115 for controlling the speed of rotation of the circular platform 18. The cam on the circular platform 18 is connected to the piston and cylinder assemblies 64 to control the oscillation of the fiber cutting and coating assemblies 53 and 54. In addition, the speed of rotation of the cutter blade roll 72 as well as the flow of air and resin into the coating nozzle 86 or spray nozzle 107 may be controlled through the control panel 115.

Figure 7:
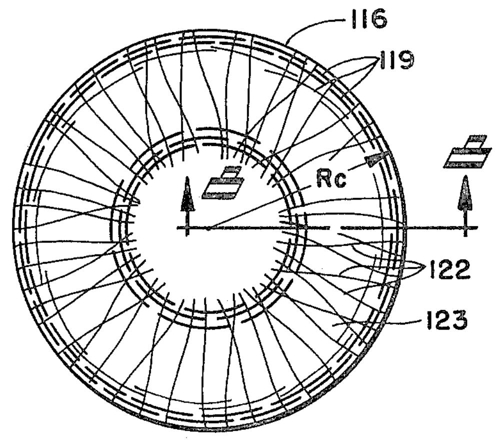
FIG. 7 is a plan view of the first preform shaping form shown in FIG. 1 for receiving the reinforcing fibers and plastic material showing the built-up preform.

Referring to FIGS. 1 and 7, a first female preform shaping form 116 having a 30 inch diameter is shown which may be made of metal, plastic or other similar material. The shaping form 116 is fastened to the circular platform 18 as by brackets 117 located at spaced-apart positions around the platform. A liner 118 of silicone, polyethylene or other antistick material is laid over the form 116 to prevent adherence of the resin and fibers to the form.

Referring to FIGS. 1 through 6 again, the preform building machine 10 is set up for operation by placing the rolls 35 of fiberglass roving on the fixed platform 28. Preferably the fiberglass roving has been sized by impregnation with three to five percent plastic material such as epoxy resin. The strands 38 of fiberglass are then threaded through the eyes 37 in the guide plates 36 on the arms 34, through the containers 42 and 43 containing sponge material 44, through the guide plates 82 and 83 and down through the holes in cross beam 47, openings 84 and guides 85 into the cutter 69 where they are gripped between the second driving roll 77 and second idler roll 79.

The first shaping form 116 is fastened to the circular platform 18 by brackets 117 and the liner 118 laid over the top of the form. The fiber cutting and coating assemblies 53 and 54 are then located at the desired positions along the shaft 48 and clamped in place through tightening of screws 58 between the upper half 56 and lower half 57 of the split bushing 55 of each assembly.

The assembly 53 is positioned to project substantially all generally circumferential fibers 119 on form 116 in a direction within ± 20° of lines perpendicular to the radii RP of the circular platform 18 and tangential to an arc of a curved body to be made with this apparatus. The assembly 54 is positioned to project substantially all generally radial fibers 122 on form 116 in a direction within ± 20° of the radii RP of the platform 18 which is substantially the same as the radii of curvature RC of the curved body made with this apparatus.

Upon actuation of the preform building machine 10 through the controls in the control panel 115, the circular platform 18 is rotated at a predetermined speed which in the present embodiment is from 6 to 18 rpm. It is desirable that certain portions of the body be thicker than others and this can be provided by varying the speed of rotation of the circular platform 18. For example, in the present embodiment the rpm of the circular platform 18 is decreased to four-tenths the normal speed for arcs of 12° to 13° at 180° intervals around the circular platform to provide sections with two and one-half times the basic deposition rate at opposite sides of the body.

The piston and cylinder assemblies 64 are actuated to tilt the fiber cutting and coating assemblies 53 and 54 about the pins 62 so that the fibers 119 and 122 are distributed in an annular band around the form 116. The tilting may be controlled and provide coverage of the form 116 depending upon the width of a preform 123 to be laid up. In this embodiment, the fiber cutting and coating assembly 53 for projecting a stream of tangential fibers 119 is tilted 7°, 35 minutes from the normal in either direction. The tilting distance is provided through actuation of the respective piston and cylinder assemblies 64 with the piston connected to assembly 53 having a two-inch stroke and the piston connected to assembly 54 having a one-inch stroke. The tilting is controlled by a cam on the platform 18 and by controls in the control box 115 so that the assembly 53 is tilted radially outward for 360°, radially inward for 180°, radially outward for 360° and then radially inward for 180° during the building cycle.

The fiber cutting and coating assembly 54 for spraying a stream of radial fibers 122 is tilted 3°, 49 minutes from the normal in either direction. The tilting is controlled by a cam on the platform 18 and by controls in the control box 115 so that the assembly 54 is tilted radially outward for 360° and then radially inward for 180° during the building cycle. These tilting sequences are repeated until the building cycle is completed.

The speed at which the cut fibers 119 and 122 of strands 38 are projected through the coating nozzles 86 is determined by the speed of the cutter blade roll 72 and in the present case, the cutter blade roll is rotated at a speed of 2200 rpm which pulls the strands at 734 feet per minute. Strand pulling speeds in the range of 400 feet per minute to 800 feet per minute may be used with this apparatus.

The circumferential fibers 119 are cut into lengths of approximately two inches and the radial fibers 122 are cut into lengths of approximately four inches. As the circular platform 18 revolves, layers of circumferential fibers 119 and radial fibers 122 are laid on the liner 118 providing the preform 123 of a predetermined thickness. In the present embodiment, the circular platform 18 is turned from 27 to 81 revolutions to provide the desired thickness. It is understood that the number of revolutions of the platform 18 can be adjusted to obtain different thicknesses of the preforms 123. Also the angle through which the fiber cutting and coating assemblies 53 and 54 are tilted can be adjusted to obtain different widths of the preform 123.

The circumferential fibers 119 and radial fibers 122 may be coated with resin in the coating nozzles 86 or, as shown in FIG. 1, the spray nozzle 107 may spray the resin on the cut fibers after they have been deposited on the form 116. When the spray nozzle 107 is used to apply the resin, the preform 123 consists of at least 43% resin and 57% fiberglass reinforcement to make sure the fibers are coated. The spray nozzle 107 is turned on to spray the resin on the fibers 119 and 122 one-half turn of the circular platform 18 after the cutters 69 are started to project the fibers on the form 116. The spray nozzle 107 is turned off one and one-half turns of the platform 18 after the cutters 69 have stopped projecting fibers 119 and 122 on the form 116. When the resin is applied to the fibers 119 and 122 by the coating nozzles 86, the fibers may be coated with a smaller amount of resin.

After the desired number of revolutions of the circular platform 18, the controls in the control panel 115 automatically stop the rotation of the platform and cut off the supply of air and resin to the coating nozzles 86 or to the resin spray nozzle 107. The shaping form 116 may then be removed from the platform 18 by disconnecting the brackets 117 and carried to another location for partial curing, shaping, compressing and drying of the preform 123. At the same time, another shaping form 116 may be placed on the circular platform 18 and mounted thereon by brackets 117 with another liner 118 placed over the top of the shaping form. The preform building machine 10 can then be actuated by turning on the controls through control panel 115 to repeat the process of building another preform 123. In the embodiment shown, the building cycle is approximately four and one-half minutes.

Figure 8:
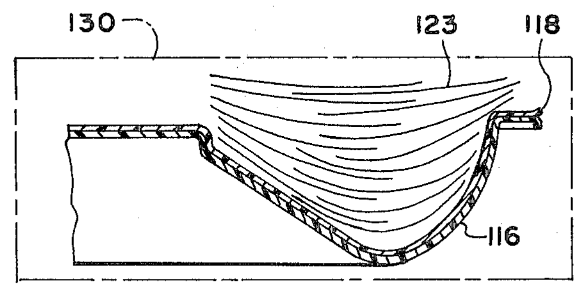
FIG. 8 is a fragmentary sectional view taken along the plane of line 8—8 of FIG. 7.

The shaping form 116 containing the preform 123, as shown in FIGS. 7 and 8, is placed in a horizontal position as shown in FIG. 8. The preform 123 is held in that position for from four to twenty-four hours in an appropriate enclosure 130 at a temperature of 80° F. ± 2° during which time the preform partially cures making it easier to handle without damages. The enclosure 130 may be an insulated box or a room into which people can walk and work with the preforms 123. In either case, heating equipment with suitable temperature controls is provided to maintain the desired temperature or temperatures for partial curing of the resin of the preforms 123.

Figure 9:
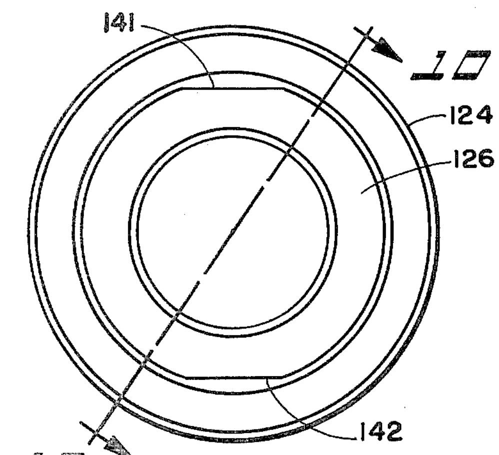
FIG. 9 is a plan view of an annular second shaping form for shaping the preform.
Figure 10:
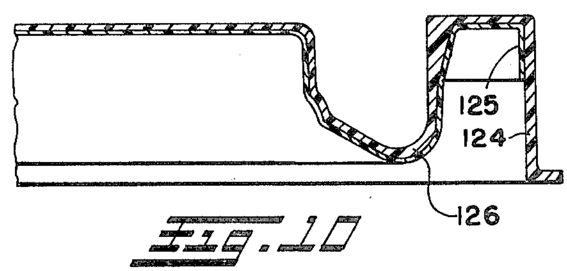
FIG. 10 is a fragmentary sectional view taken along the plane of line 10—10 of FIG. 9.
Figure 11:
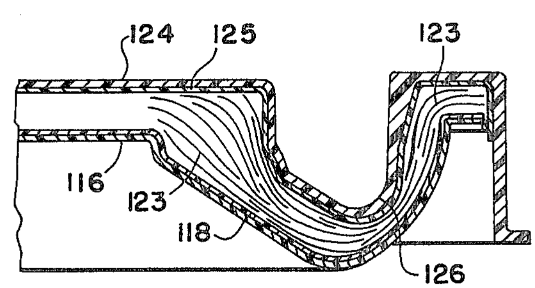
FIG. 11 is a fragmentary sectional view like FIGS. 8 and 10 showing the second shaping form laid on top of the first shaping form.
Figure 12:
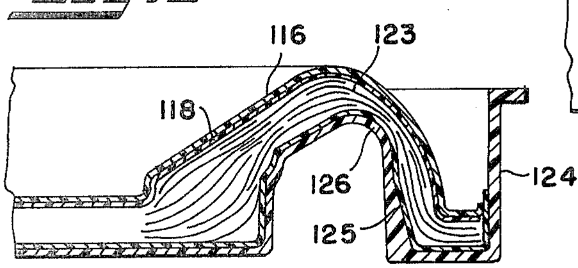
FIG. 12 is a view like FIG. 11 showing the assembly in an enclosure shown in chain-dotted lines for controlled partial curing. The assembly is inverted to place the first shaping form on top the second shaping form.
Figure 13:
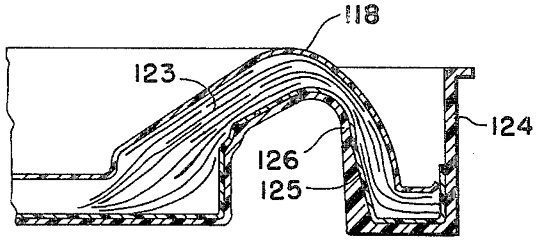
FIG. 13 is a view like FIG. 12 with the first shaping form removed.
Figure 14:
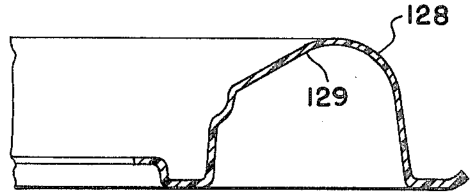
FIG. 14 is a fragmentary sectional view of an annular third shaping form for shaping the preform.

A male second shaping form 124, shown in FIGS. 9 and 10, having a liner 125 is then placed over the preform 123 and first shaping form 116 as shown in FIG. 11. The second shaping form 124 has a ring 126 with a contour which closely approximates the final inside shape of the molded body 127, shown in FIG. 17. The assembly of the first shaping form 116, preform 123 and second shaping form 124, shown in FIG. 11, is then inverted to the position shown in FIG. 12. The first shaping form 116 may then be removed from the second shaping form, as shown in FIG. 13, so that a female third shaping form 128, shown in FIG. 14, may be substituted for the form 116 to further compress the preform 123. The third shaping form 128 has an annular cavity 129 with a contour substantially the same as the outside contour of the molded body 127, as shown in FIG. 17.

Figure 15:
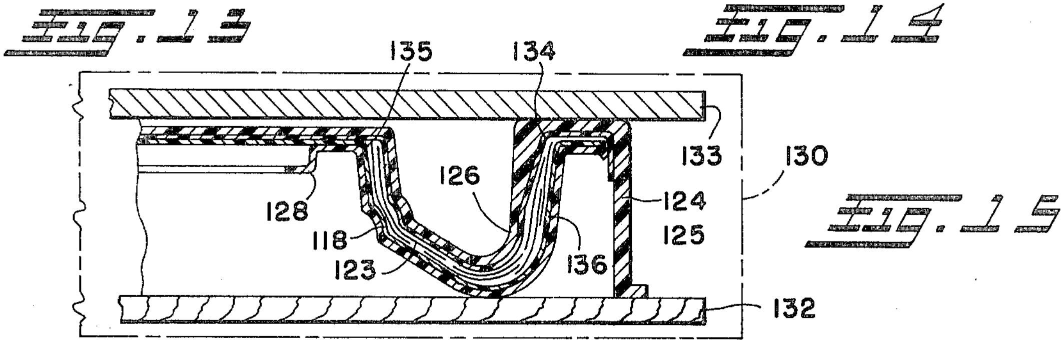
FIG. 15 is a fragmentary sectional view like FIG. 13 with the third shaping form substituted for the first shaping form and with the assembly inverted and in an enclosure shown in chain-dotted lines.

The assembly of the third shaping form 128 laid on top of liner 118 and preform 123 along with the second shaping form 124 and liner 125 is then inverted into the position shown in FIG. 15. The third shaping form 128 and second shaping form 124 may rest on a surface such as a table 132 and a press or a weight such as plate 133 may be applied to the top of the second shaping form 124 to uniformly apply pressure around the circumference of the preform 123. This shaping may be done under certain conditions in a short time; however, in the preferred embodiment, the preform 123 is held in the position between the third shaping form 128 and the second shaping form 124 for a period of approximately forty-eight hours at a temperature of 80° F. ± 2° during which time the resin in the preform is partially cured with some of the mixture flowing from radially outer edge 134 of the preform 123 and radially inner edge 135 towards the intermediate portion 136 to provide a compact, solid structure after molding.

After the preform 123 is compressed, shaped and partially cured in the condition shown in FIG. 15, it may be removed from the second shaping form 124, third shaping form 128 and the liners 118 and 125. Then the preform 123 is preheated in an oven 137 to soften the material so that it will conform to a mold 138, shown in FIG. 17. Also the internal temperatures of the preform 123 are increased to provide a more uniform cure and all the cure heat does not have to be transmitted to the preform through the surface of the mold 138. The oven 137 is a microwave oven for establishing a temperature of the preform 123 at the part having the greatest thickness of from 150° F. to 160° F. This may be obtained in a period of from one to one and one-half minutes.

Figure 17:
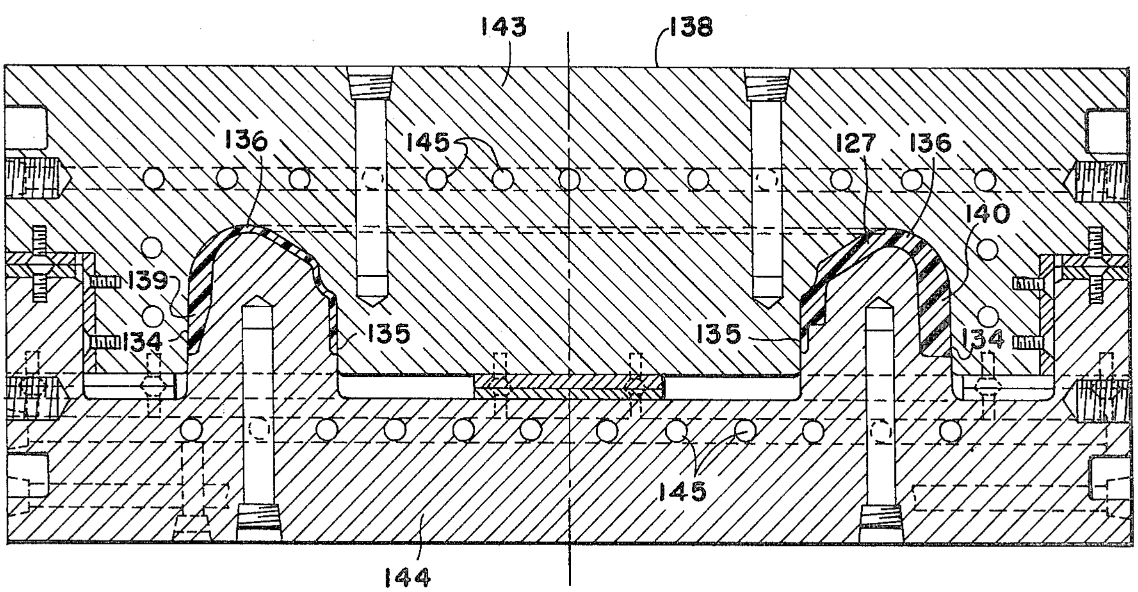
FIG. 17 is a sectional view taken along different radial planes of the mold for molding the curved annular body.
Figure 18:
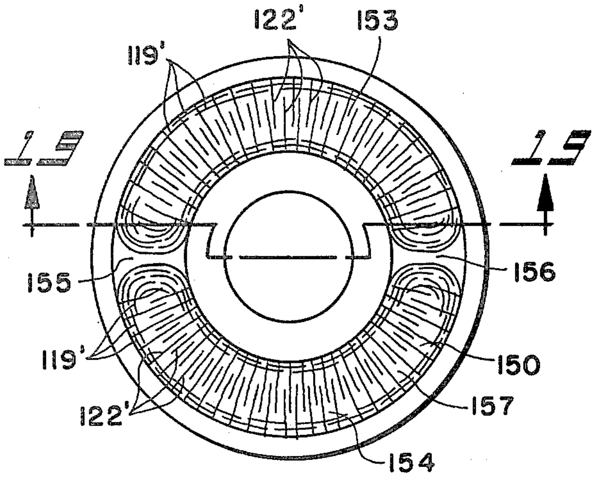
FIG. 18 is a plan view of a modified rotatable first preform shaping form for receiving the reinforcing fibers and plastic material showing the built-up preform.

The section 139 of the molded body 127 at the left side, shown in FIG. 17, has a lesser thickness than the section 140 on the right side to illustrate the different thicknesses of the molded body which are possible through the use of this method. The greater thickness on the right side is also accommodated in the shaping process by decreasing the width of the annular ring 126 of the second shaping form 124 at 180° positions 141 and 142 as shown in FIG. 9.

The mold 138 has a top section 143 in mating engagement with a bottom section 144 and may have passages 145 for conveying temperature-conducting media such as steam. The molded body 127 resulting from the molding process of the preform 123 is held in the mold 138 under a surface temperature of 300° F. plus or minus 10° and a high pressure after which it is removed and allowed to cool. After the curved body 127 is removed from the mold 138 it may be cut into two semicircular sections through the thick sections 140, shown on the right side of FIG. 17. Then by suitable fasteners, it may be used as a tire support mounted on a rim for supporting a tire in the deflated condition. In the present embodiment, the curved body 127 has a U-shaped cross section; however, it is understood that other circular or segmental cross-sectional shapes may be made through the method and apparatus of the invention.

Figure 19:
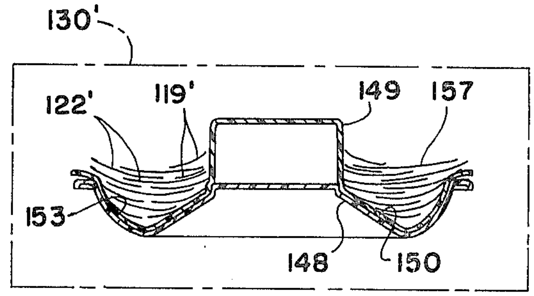
FIG. 19 is a fragmentary sectional view taken along the planes of line 19—19 of FIG. 18 showing the preform of reinforcing fibers and plastic material laid in the first shaping form.
Figure 30:
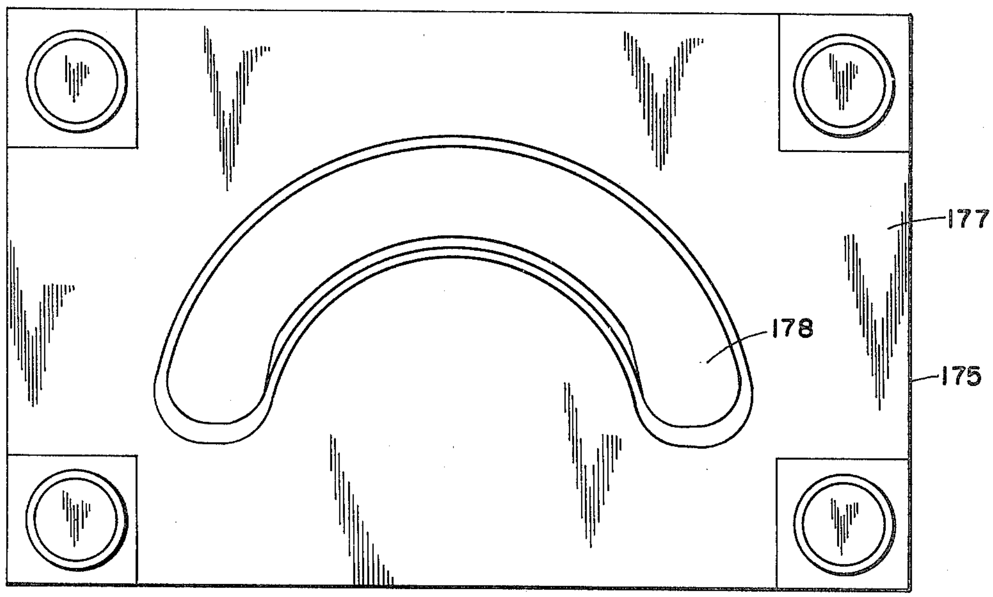
FIG. 30 is a plan view of the lower half of the mold showing the curved shape of the molded body.
Figure 31:
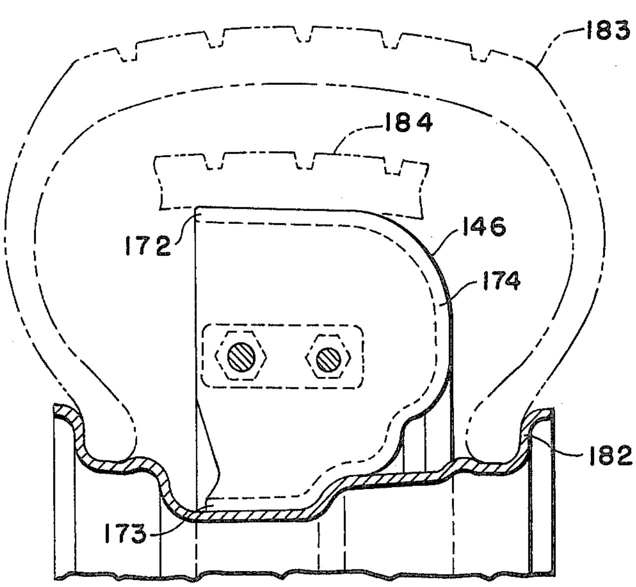
FIG. 31 is a fragmentary sectional view of the molded semicircular body of FIG. 29 shown mounted on a tire rim and bolted to a second semicircular body to form a tire support for a tire in the deflated condition with the tire being shown in chain-dotted lines.

Referring to FIGS. 18 through 30, a modified apparatus and method is illustrated for making a semicircular curved body 146 molded of reinforced plastic material and having a U-shaped cross section with closed ends 147, as shown in FIG. 31. In this embodiment, an annular first female preform shaping form 148 is mounted on the circular platform 18 as by the brackets 117′. A liner 149 is laid over the top of the shaping form 148 to prevent sticking of the fibers to the form. The shaping form 148 has an annular cavity 150 which is divided into two sections 153 and 154 by dividers 155 and 156, spaced at intervals of approximately 180° circumferentially of the form. A preform 157 made up of circumferential fibers 119′ and radial fibers 122′ is built on top of the liner 149 in each of the sections 153 and 154 by the operation of the preform building machine 10 described hereinabove. After the preform building machine 10 is stopped, the first shaping form 148 may be removed from the circular platform 18 by disconnecting the brackets 117′ and moving the form to another location. As shown in FIG. 19, the preform 157 is held in an appropriate enclosure 130′ and then permitted to partially cure over a period of four to twenty-four hours at a temperature of 80° F. ± 2°.

Figure 20:
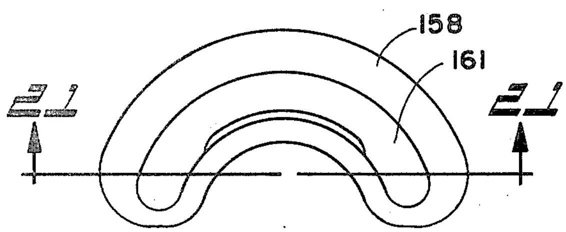
FIG. 20 is a plan view of one of two semicircular second shaping forms for laying over the modified first shaping form of FIGS. 18 and 19.
Figure 21:
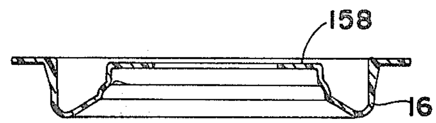
FIG. 21 is a sectional view taken along the plane of line 21—21 of FIG. 20.
Figure 22:
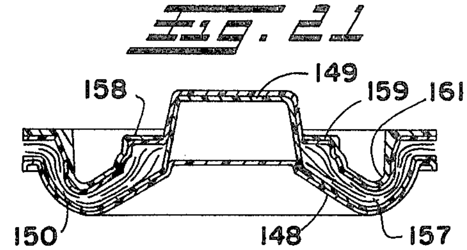
FIG. 22 is a sectional view like FIGS. 19 and 21 showing one of the second shaping forms laid over the first shaping form to shape semicircular preforms.
Figure 25:
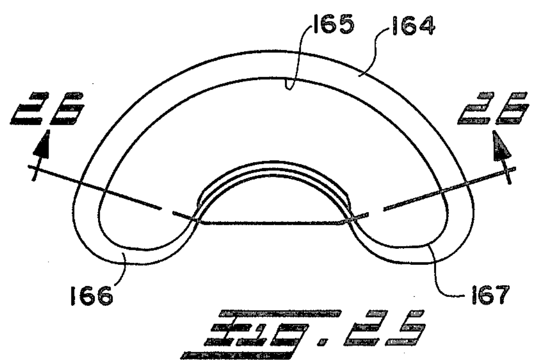
FIG. 25 is a plan view of a third semicircular shaping form for shaping a semicircular preform.
Figure 26:
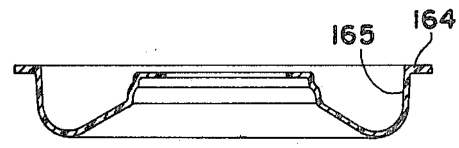
FIG. 26 is a sectional view taken along the planes of line 26—26 of FIG. 25.

Semicircular second male shaping forms 158, shown in FIGS. 20 and 21, may be placed in each of the sections 153 and 154 with a liner 159 separating the second shaping forms from the preform 157, as shown in FIG. 22. Each of the second shaping forms 158 has a curved protrusion 161 with a configuration substantially the same as the inner surface of the curved body 146 after molding for extension into the annular cavity 150 and exerting pressure against the liner 159 to shape the preform 157 into the shape shown in FIG. 22.

Figure 23:
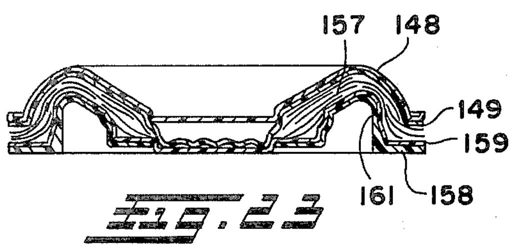
FIG. 23 is a sectional view like FIG. 22 with the assembly inverted and in an enclosure shown in chain-dotted lines for controlled partial curing.
Figure 24:
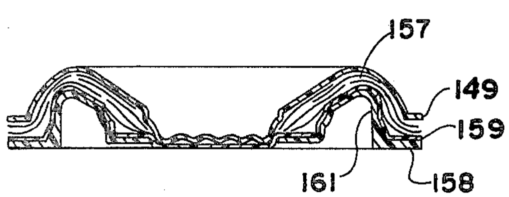
FIG. 24 is a sectional view like FIG. 23 with the modified first preform shaping form removed.

The assembly of the annular first shaping form 148, preform 157 and semicircular second shaping forms 158 for both sections 153 and 154 is then inverted into the condition shown in FIG. 23. The first shaping form 148 is then removed, leaving each of the preforms 157 covered by the liner 149 which may be in two parts to permit separation of the preforms.

Figure 27:
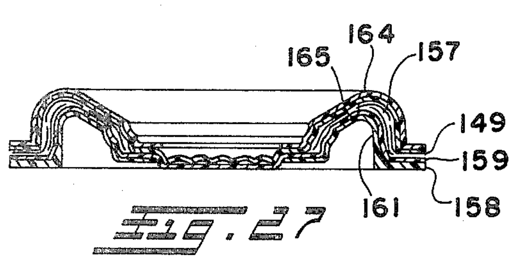
FIG. 27 is a view like FIG. 24 with the third semicircular shaping form laid over the second shaping form of FIGS. 20 and 21.

Since the following description for one of the preforms 157 applies to the other, it will be limited to only one preform. A semicircular female third shaping form 164, shown in FIGS. 25 and 26, has a curved cavity 165 with closed ends 166 and 167 for placing over the liner 149, preform 157 and second shaping form 158, as shown in FIG. 27. This assembly is then inverted to the position shown in FIG. 28 and may be compressed by a press or between a surface such as a table 168 on which the third shaping form 164 rests and a weight such as plate 169 bearing against the second shaping form 158.

Figure 28:
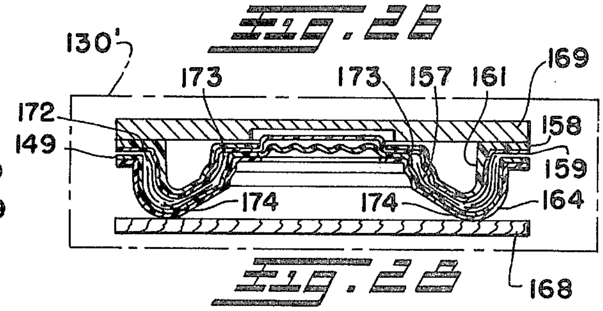
FIG. 28 is a view like FIG. 27 showing the assembly inverted and being compressed in an enclosure shown in chain-dotted lines.
Figure 29:
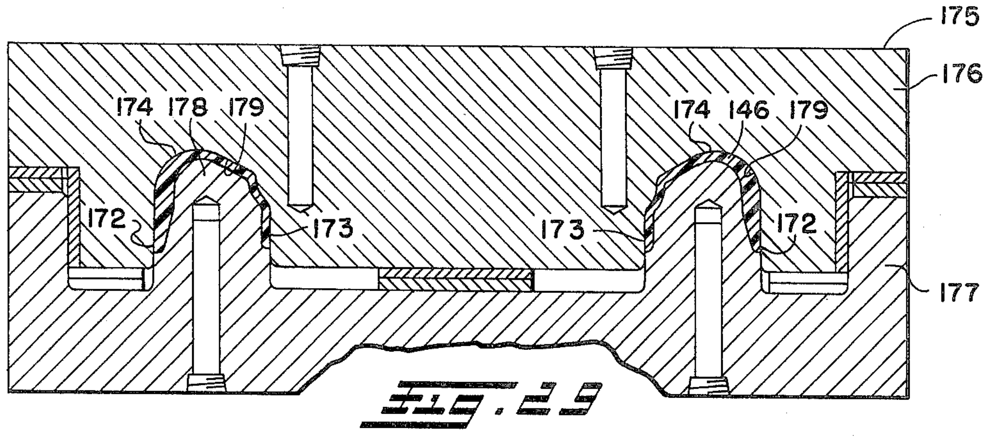
FIG. 29 is a sectional view of a mold for molding the semicircular body from the preform.

Radially outer edges 172 and radially inner edges 173 of the curved body 146 and preform 157 having a U- shaped cross section are in an elevated condition, as shown in FIG. 28. The preform 157 is shaped and partially cured in the enclosure 130' at a temperature of 80° F. ± 2° for forty-eight hours and the resin in the radially outer edges 172 and radially inner edges 173 flows towards an intermediate portion 174 of the preform.

Figure 16:
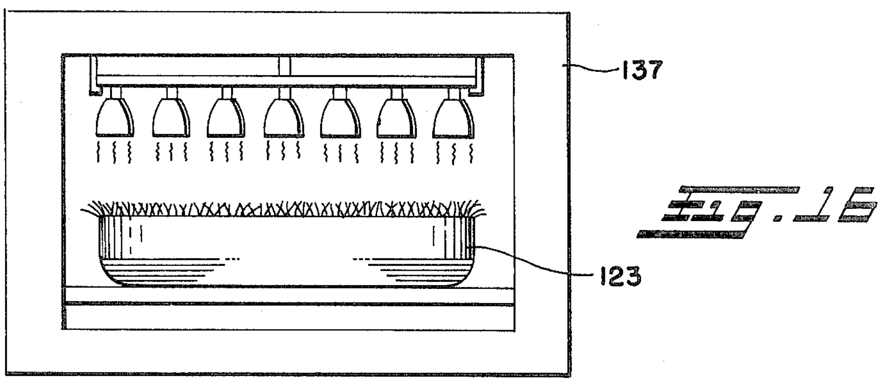
FIG. 16 is a schematic view of a dielectric oven for preheating the partially cured shaped preform.

The partially cured, compressed, shaped and dried preform 157 may then be removed from the enclosure 130' and preheated in an oven such as that shown in FIG. 16 after which it may be molded in a mold 175 having an upper section 176 and a lower section 177 in mating engagement, as shown in FIG. 30. The mold 175 produces a curved body 146 having closed ends 147 because the lower mold section 177 has a semicicular male rib 178 which fits in a semicicular cavity 179 in the upper mold section 176. The preform 157 is molded under pressure at a temperature of 300° F. ± 10° for a suitable period of time producing the curved body 146.

Two of these curved bodies 146 may be bolted together around a rim 182 on which a tire 183 is mounted as shown in FIG. 31. Upon deflation of the tire 183, the tread portion 184 may engage the curved bodies 146 at the radially outer edges 172 for supporting the tire in the deflated condition, as shown in FIG. 31.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for forming a curved fiber reinforced body of plastic material comprising a generally horizontal support rotatable about a generally vertical axis, a first fiber depositing means mounted at a first position over said rotatable support, a second fiber depositing means mounted at a second position over said rotatable support, said first and second fiber depositing means each including fiber strand cutting means to cut strands of fibers supplied to said fiber depositing means into fibers of predetermined lengths, means to supply a plastic material to coat said cut fibers, drive means to rotate said rotatable support, said first fiber depositing means being positioned to deposit a stream of radial fibers onto said support in directions generally along the radii of curvature of said curved body and said second fiber depositing means being positioned to deposit a stream of circumferential fibers onto said support in directions generally tangential to an arc of said curved body whereby a preform for said body is built up of successive layers of fiber and plastic material as said rotatable support turns through successive revolutions under said first and second fiber depositing means.

2. Apparatus for forming a curved fiber reinforced body of plastic material in accordance with claim 1 wherein said first fiber depositing means includes a first nozzle means and said second fiber depositing means includes a second nozzle means.

3. Apparatus for forming a curved fiber reinforced body of plastic material in accordance with claim 2 wherein at least one of said first and second nozzle means includes a converging venturi member having a throat of reduced diameter at one end, a ring member having an orifice with a diameter greater than the diameter of said throat disposed with one side adjacent said end and a diverging funnel-shaped member at the other side of said ring member, an air orifice for transmitting air between said ring and said diverging funnel-shaped member, and a plastic ejecting orifice between said ring and said end of said venturi member for coating said fibers with said plastic material as they are propelled through said nozzle means.

4. Apparatus for forming a curved fiber reinforced body of plastic material in accordance with claim 1 wherein said strand cutting means includes a driving cutter blade roll in cutting engagement with a mandrel roll at a first position on the surface of said cutter blade roll and a second driving roll in rolling engagement with an idler roller at a second position on said second driving roll, said second driving roll being disposed in tangential alignment with said cutter blade roll whereby a plane tangential to said cutter blade roll at said first position is also tangential to said second driving roll at said second position for producing cut lengths of said fiber which maintain their integrity and thereby occupy a minimum of space in said curved body.

5. Apparatus for forming a curved fiber reinforced body of plastic material in accordance with claim 4 wherein said mandrel roll and said second driving roll have the same diameter, an idler roll is interposed between and in engagement with said second driving roll and said mandrel roll for driving said second driving roll at the same speed said mandrel roll is driven by said cutter blade roll to convey said fibers to said cutter blade roll at the same speed as they are cut to maintain the fiber in an integral compact condition after cutting.

6. Apparatus for forming a curved fiber reinforced body of plastic material in accordance with claim 4 including nozzle means with a converging funnel-shaped venturi member having a throat of reduced diameter at one end and a longitudinal axis in alignment with said plane tangential to said cutter blade roll for receiving said cut lengths of fibers as they are driven away from said cutter blade roll, a ring member having an orifice with a diameter greater than the diameter of said throat disposed with one side adjacent said end of said venturi member and a diverging funnel-shaped member at the other side of said ring member, an air orifice for transmitting air between said ring and said diverging funnel-shaped member, and a plastic ejecting orifice between said ring and said end of said venturi member for coating said fibers with said plastic material as they are propelled through said nozzle means.

7. Apparatus for forming a curved fiber reinforced body of plastic material in accordance with claim 1 wherein said drive means includes a variable speed control to vary the speed of rotation of said rotatable support at a predetermined position during rotation thereof to increase the thickness of said curved body at said position by reducing the speed of rotation or to decrease the thickness by increasing the speed of rotation.

8. Apparatus for forming a curved fiber reinforced body of plastic material in accordance with claim 7 wherein stop and go control means are included operatively connected to said drive means, said strand cutting means, said fiber depositing means and said means to supply a plastic material to said fibers.

9. Apparatus for forming a curved fiber reinforced body of plastic material in accordance with claim 1 wherein a female first shaping form having a contour corresponding with the shape of said curved fiber reinforced body is removably mounted on said support and said fibers are deposited on said form to build said preform for said body in a shape conforming to said contour of form.

10. Apparatus for forming a curved fiber reinforced body of plastic material in accordance with claim 9 wherein said plastic material contains a curative for partial curing of said plastic material after coating of said fibers and means are provided for controlling the temperature of said preform to provide the partial curing of said plastic material after removal of said shaping form from said support.

11. Apparatus for forming a curved fiber reinforced body of plastic material in accordance with claim 10 wherein said means for controlling the temperature of said preform includes an enclosure for said preform and means to control the temperature of the air within said enclosure.

12. Apparatus for forming a curved fiber reinforced body of plastic material in accordance with claim 9 wherein a matching male second shaping form is provided for placing over said preform after removal from said rotatable support for shaping and containment between said first shaping form and said second shaping form upon inversion of said preform, said first shaping form and said second shaping form.

13. Apparatus for forming a curved fiber reinforced body of plastic material in accordance with claim 12 wherein a female third shaping form is provided having a contour substantially conforming to the final contour of said curved fiber reinforced body whereby said third shaping form can be substituted for said first shaping form and the resulting assembly inverted to provide for compression of said preform and drainage of said plastic material away from the raised edges.

14. Apparatus for forming a curved fiber reinforced body of plastic material in accordance with claim 1 wherein said apparatus further includes a mold to bond said radial fibers, said circumferential fibers and said plastic material under heat and pressure.

15. Apparatus for forming a curved fiber reinforced body of plastic material in accordance with claim 14 wherein said apparatus further includes an oven to preheat said curved fiber reinforced body of plastic material prior to molding in said mold.

16. Apparatus for forming a curved fiber reinforced body of plastic material in accordance with claim 2 wherein said means to supply a plastic material to said fibers includes means to supply liquid resin under pressure to said nozzle means.

17. Apparatus for forming a curved fiber reinforced body of plastic material in accordance with claim 1 wherein said means to supply a plastic material further includes spray means mounted at a third position over said rotatable support and said means to supply liquid resin under pressure supplies resin to said spray means for application of resin to said fibers deposited on said support.

* * * * *